Figure 3A:
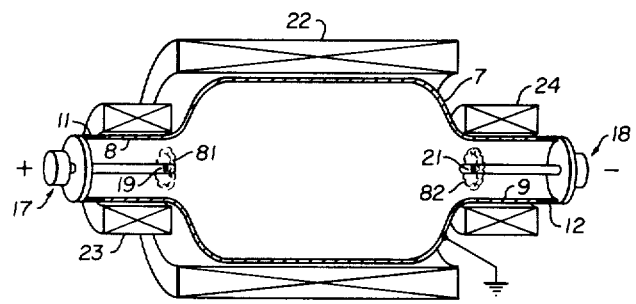

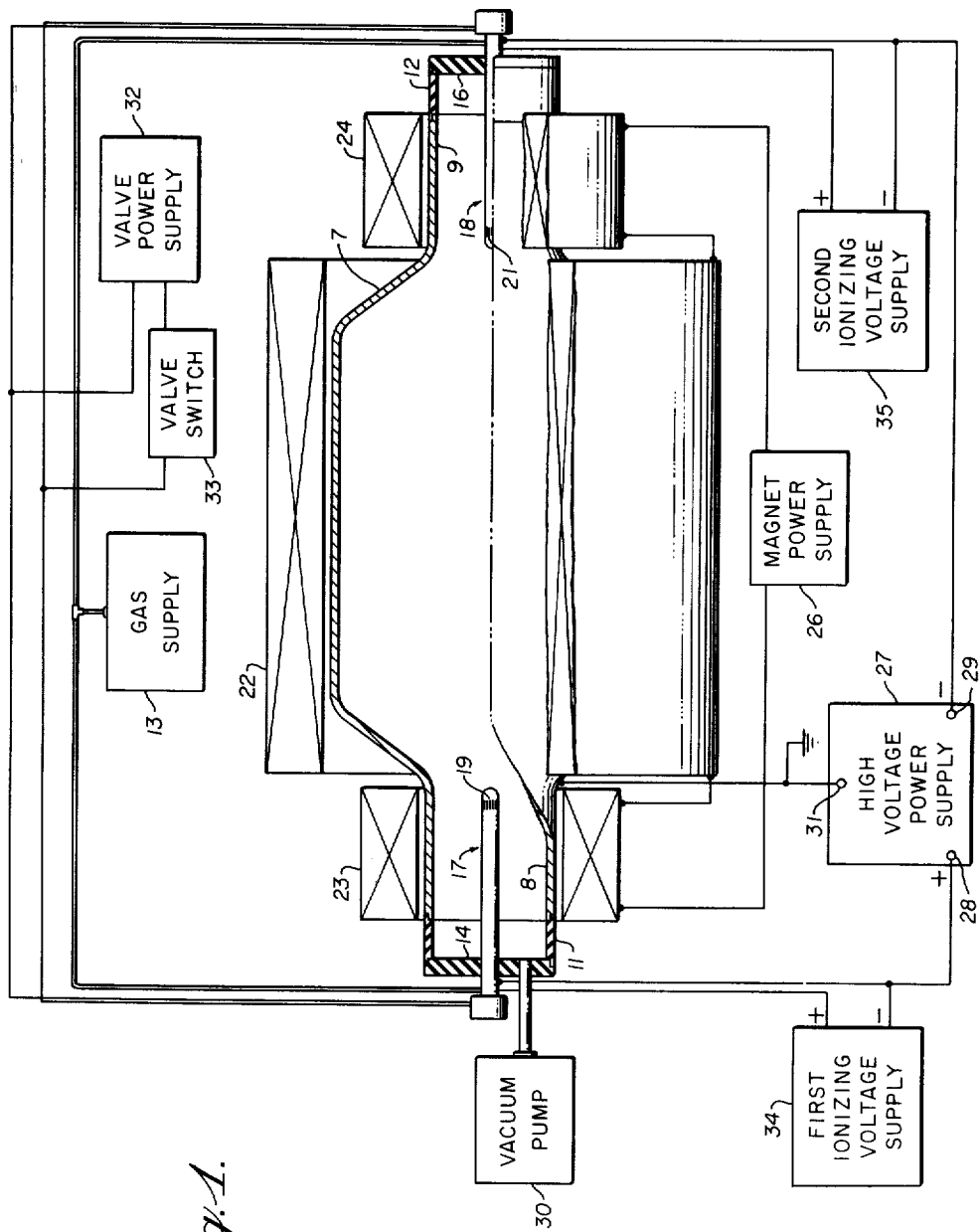

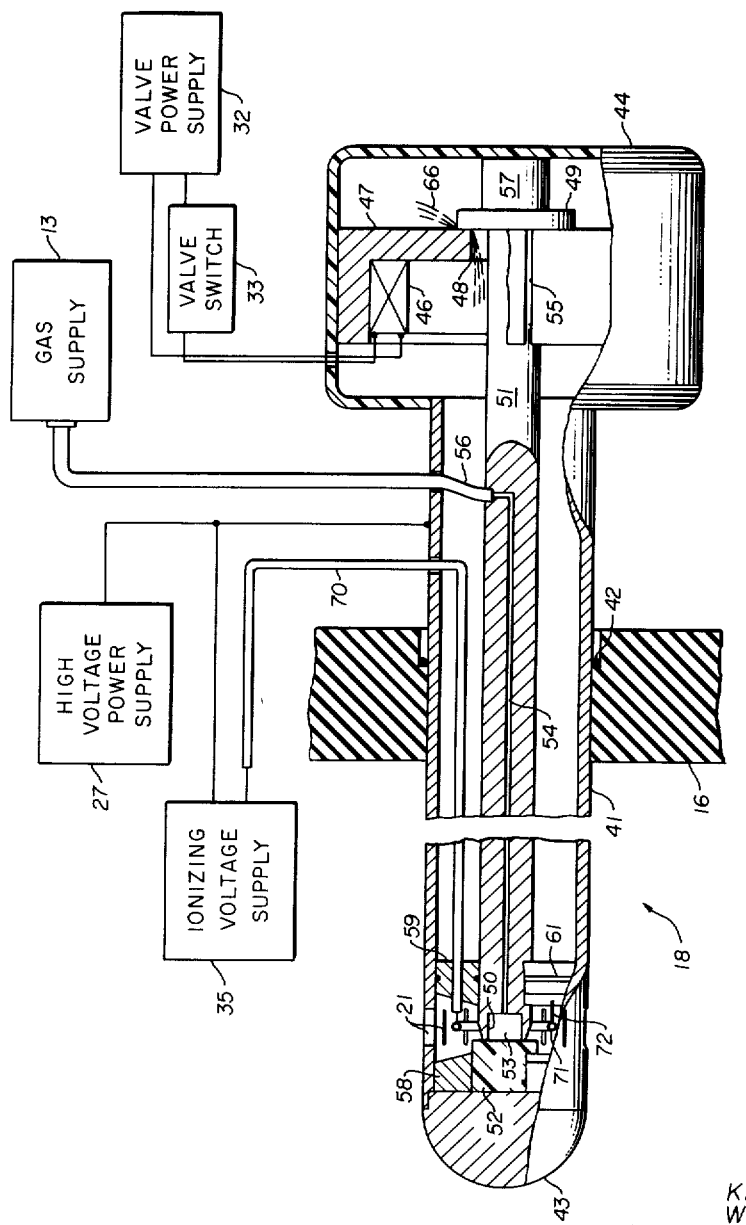

United States Patent Office 3,096,269
Patented July 2, 1963

3,096,269
COUNTERROTATING PLASMA DEVICE
Klaus Halbach, Berkeley, William R. Baker, Orinda, and Didier Veron, Berkeley, Calif., assignors to the United States of America as represented by the United States Atomic Energy Commission
Filed May 23, 1961, Ser. No. 112,132
11 Claims. (Cl. 204—193.2)

The present invention relates to apparatus for generating, containing and heating an ion electron plasma to produce energetic ions, neutrons and nuclear interactions.

A considerable effort is being made to provide improved apparatus in which a gas, such as deuterium, can be ionized and the resultant plasma contained and heated. Such apparatus may serve several purposes which include the production of energetic ions, the production of neutrons and, where sufficient containment and heating is realized, the initiation of controlled thermonuclear reactions.

U.S. Patent No. 3,021,272, entitled Plasma Heating and Confining Device and issued February 13, 1962, by the present inventors William R. Baker et al., describes a plasma apparatus of a type which utilizes crossed magnetic and electric fields for confining and heating charged particles. In the apparatus of U.S. Patent No. 3,021,272 the plasma is contained within a cylindrical vacuum vessel having an axially directed magnetic field. A potential difference is applied between the vessel and an axially aligned tubular electrode therein providing a radial electric field which crosses the magnetic field to define an annular plasma trapping region. The present invention provides an apparatus of the same general class with novel and more effective structure for converting ordered rotational plasma energy into thermal energy.

In addition to providing a highly effective mechanism for randomizing particle motion in the plasma, the invention has another important property which enhances plasma containment. One important factor to be considered in this type of apparatus is that of preventing contaminants from being released into the plasma, such contaminants acting to cool the plasma and to interfere with the occurrence of the desired reactions. Generally the contaminants are released from either the walls of the surrounding vessel or from the surface of the insulators utilized in the plasma heating device, the latter source of contaminants being the most important since it is across the insulators that high voltage gradients occur. As a consequence of such high voltage gradients, breakdown frequently occurs along the insulator surface, releasing sufficient insulator material to contaminate the plasma and greatly reduce the number of desired reactions therein.

Since plasma devices utilize insulators which are exposed to the plasma containment region, it is desirable that the insulators be remote from the vicinity of the heated plasma. To prevent the plasma reaction from occurring near insulators, it is necessary to prevent un-ionized fuel gas from reaching the insulators. In other words, there should be a vacuum near the insulators while a short distance away, and with no intervening physical barrier, there is a gas.

The intensity of plasma heating is due, in part, to the magnitude of the electric field obtainable. Again, the insulators become a major consideration in that it is important to keep the discharge away from the insulators to avoid deterioration thereof through intense bombardment by energetic particles. Voltage breakdown will occur at a lower potential across the insulator after such deterioration has occurred, thereby limiting the maximum electric field strength which may be obtained. Thus both a more pure plasma is obtained and a higher electric field can be held by preventing the plasma from contacting the insulators.

The foregoing results are achieved in the present invention with a structure which includes an annular magnetic field coil disposed around a cylindrical vacuum envelope and having intensified fields at each end to provide a pair of facing spaced magnetic mirrors within the envelope. An electrode is disposed at each end of the envelope, the electrodes being isolated from the envelope by suitable insulators. The electrodes are disposed along the axis of the envelope and extend into the magnetic mirror regions thereof. A first of the electrodes is charged positively with respect to the vacuum envelope and the second electrode is negatively charged with respect thereto so that oppositely directed radial electric fields are present at each end of the vacuum chamber, the fields being crossed with the axial magnetic field to provide an annular plasma region at each end of the envelope.

Operation of the apparatus is initiated by rapidly injecting simultaneous pulses of gas from the inner end of each electrode. The gas from the two electrodes is immediately ionized, creating annular plasma bodies which rotate in opposite directions. Centrifugal force causes each plasma body to move inwardly along the magnetic field lines away from the mirror field and therefore to collide with the other contra-rotating plasma body. Before contact occurs, the opposite electric fields in the two bodies cause large electron currents to flow between the two bodies and large ion current to flow within each body. The encounter creates considerable heating, due to ion-ion collisions, in addition to that already present, and further promotes the occurrence of ion interactions.

Accordingly, it is an object of this invention to provide an improved plasma generating and containment means of the class employing crossed electrical and magnetic fields.

It is another object of the present invention to provide means for enhancing heating in a plasma containment apparatus of the type utilizing crossed electrical and magnetic fields.

It is another object of the invention to provide a means for thermally energizing a plasma by producing interaction between two oppositely rotating annular plasma bodies.

It is an object of this invention to provide means for avoiding plasma contamination in an apparatus of the class utilizing crossed electrical and magnetic fields to generate plasma.

It is a further object of the invention to provide a means for producing a plasma while maintaining maximum isolation from insulator surfaces.

It is another object of the invention to provide an improved means for avoiding breakdown across insulators in the presence of a high electric field.

It is yet another object of the invention to provide a rapidly functioning valve for releasing a measured quantity of gas with means for accurately synchronizing two or more such valves.

The invention, both as to its organization and method of operation, together with further objects and advantages thereof, will be better understood by reference to the following specification taken in conjunction with the accompanying drawing in which:

FIG. 1 is a broken out view of the invention showing portions thereof in longitudinal section, FIGURE 2 is a longitudinal section view showing a rapidly functioning valve suitable for use in the apparatus of FIGURE 1, and FIGURES 3a to 3d are schematic views illustrating successive stages in the operation of the apparatus of FIGURE 1.

Referring now to FIGURE 1, there is shown a cylindrical hollow tank 7 of stainless steel or similar conductive material and having first and second neck portions 8 and 9 of reduced diameter at opposite ends, the two necks being identical in size and length. The tank 7 assembly is symmetrical about a central transverse plane therethrough. The neck portions 8 and 9 are extended by cylindrical insulators 11 and 12 respectively. The outer ends of the tank necks 8 and 9 are closed by disc shaped insulators 14 and 16 respectively to hermetically seal the interior of tank 7.

Tubular first and second fast valves 17 and 18 are disposed along the center line of the tank 7, and are sealingly transpierced through disc insulators 14 and 16 respectively. The end of each valve 17 and 18 extends through the associated neck and into the tank 7 for a short distance. The opposite end of each valve 17 and 18 passes through the associated disc insulator 14 and 16 and is thus supported and electrically isolated from the tank 7 by the cylindrical insulators 11 and 12 and the disc insulators 14 and 16. Near the inner end of each of the valves 17 and 18 a plurality of gas apertures 19 and 21 are formed in annular band around the valve. A sudden burst of gas such as deuterium can be released simultaneously through the apertures 19 and 21 to initiate operation of the apparatus, such gas being obtained from a supply 13 coupled to the valves 17 and 18 at the outer ends thereof. The internal structure of the valves 17 and 18 will be hereinafter described.

An annular magnetic field coil 22 is disposed coaxially around tank 7 to provide an axially directed field therein and two annular mirror field coils 23 and 24 of lesser diameter are disposed coaxially around the necks 8 and 9. Coils 22, 23 and 24, having a power supply 26, provide mutually aiding magnetic fields in the necks 8 and 9, relative to the field of coil 22, the resultant field thus has a two ended magnetic mirror configuration which acts to restrain the movement of charged particles outwardly along the axis of the apparatus in a manner well understood within the art.

A high electrical potential is applied to both valves 17 and 18 to establish a strong radial electric field between each of the valves and the tank 7 with the potentials on the two valves 17 and 18 being approximately equal but of opposite polarities. To provide the electrical fields, a high voltage power supply 27 has positive and negative voltage terminals 28 and 29 connected to the valves 17 and 18 respectively. The tank 7 is connected to an intermediate potential terminal 31 on the high voltage power supply 27. Grounding of the tank 7 and terminal 31 is a preferred precaution to minimize the possibility of arcing to other components and for the protection of operating personnel. An electrical power supply 32 is connected through a valve switch 33 to each of the valves 17 and 18 for the purpose of initiating the release of gas through the apertures 19 and 21. The manner in which the valves are electrically actuated will be hereinafter described. First and second ionizing voltage supplies 34 and 35 are connected to a Penning type of ionizing structure disposed in each of the valves 17 and 18 respectively, such structure providing a small number of electrons in the gas issuing through the apertures 19 and 21 which structure will also be later described in greater detail. The electrons cause more rapid breakdown of the gas and consequently more precise timing of the breakdown is possible.

A conventional vacuum pump 30 is coupled to the interior of the tank 7 through an opening in the closure member 14.

Referring now to FIGURE 2, the detailed structure of the valve 18 is shown, the opposite valve 17 being identical with valve 18. A long tubular cylinder 41 forms the valve housing and passes through the center of member 16 along the centerline of tank 7, a vacuum tight O-ring 42 being disposed between the cylinder and insulator 16. As hereinbefore described, an annular band of gas apertures 21 is formed in the cylinder 41 near the inner end thereof. The inner end of cylinder 41 is closed by a circular member 43. Both the cylinder 41 and closure member 43 are utilized as an electrode and are thus made from some suitable conductive material such as copper or stainless steel. The outer end of the cylinder 41 is attached to a larger coaxial cylinder 44 which forms a housing for an annular magnetic field coil 46. The larger cylinder 44 isp referably constructed from some non-magnetic and non-conductive material such as a polyvinyl plastic.

The coil 46 is partially enclosed by a copper field shaping member 47 having a cylindrical portion disposed coaxially around the coil and having a disc shaped end portion with a central aperture 48. Such field shaping member 47 will ordinarily have at least one radial slit 55 extending through both the disc portion and the cylindrical portion to prevent the member 47 from functioning as a shorted turn of a transformer.

The magnetic field from the coil 46 will be rapidly pulsed in order to open the valve. Such a rapidly changing magnetic field will not immediately penetrate a conductive material such as the field shaping member 47 and therefore the member acts to centrate the field of coil 46 through the central aperture 48.

When the valve mechanism is not energized, the aperture 48 is closed by an enlarged circular head 49 on one end of a long titanium rod 51 which is disposed along the axis of the valve housing 41. The opposite end of the rod 51 has an annular axially projecting lip 50 which abuts against a resilient Teflon block 52 disposed within housing cylinder 41 against closure cap 43. The tip 50 in conjunction with the adjacent surface forms a small plenum chamber 53 which is filled with gas through an axial passage 54 within the rod 51 and through a flexible tube 56 connecting with the fuel gas supply 13. The flexible tube 56 permits a slight axial motion of the rod 51 without disrupting the gas flow. The head 49 at the outer end of rod 51 abuts against a second resilient block 57 which is secured to the inner wall of the cylinder 44 along the axis thereof.

A first and a second annular conductive baffle 58 and 59 are disposed coaxially within cylinder 41 on each side of the ring of apertures 21 thereof, the first baffle 58 encircling the resilient block 52 while the second baffle encircles the rod 51. An O-ring 61 is disposed around the second baffle 59 to provide a vacuum seal between the baffle and cylinder 41. Baffles 58 and 59 channel gas released from the plenum chamber 53 to the apertures 21.

In the operation of the valve, the chamber 53 is filled with gas from the supply 13 and the valve switch 33 of FIGURE 1 is closed, causing a pulse of current to flow through the coil 46. Energization of the coil 46 causes a magnetic field thereabout as indicated by dashed field lines 66 in FIGURE 2. Since the rapidly rising magnetic field cannot immediately penetrate the conductive field shaping member 47 or the titanium rod 51, the field lines 66 must pass through the central aperture 48 between the head 49 and the field shaping member 47 to complete a magnetic circuit. Although the second resilient block 57 forces the head 49 against the member 47, the increasing magnetic field generates a sharp strong force pushing the head 49 away from the member 47, momentarily compressing the second resilient block 57. An acoustical wave is created in the rod 51 sufficient to separate the lip 50 from the Teflon resilient block 52 and release the gas in the plenum chamber 53. The gas rapidly escapes through the apertures 21. The magnetic field subsequently decays and the resiliency of the second block 57 returns the rod 51 to the quiescent position.

The quantity of gas released is determined by the size of the plenum chamber 53 and the pressure in the gas supply 13. The resistance to gas flow through the narrow gas passage 54 is sufficiently high to practically eliminate from consideration the additional gas which would be emitted therefrom during the very short time the chamber 53 is opened. Thus the quantity of gas released from the chamber 53 is accurately determinable within limits without consideration as to the duration of the time interval the chamber 53 is opened.

Although it is not essential under all circumstances, if difficulty is experienced in synchronizing breakdown of the gas released from the valves 17 and 18, it may be desirable to create a small number of free electrons within the gas before it passes through the apertures 21. Accordingly a pre-ionizing mechanism is shown with the valve in FIGURE 2 for ionizing a small portion of the gas and thereby providing free electrons. An insulated conductor 70 from the ionizing voltage supply 35 is electrically connected to an ionizing ring 71 which is disposed coaxially within cylinder 41 between the first and second baffles 58 and 59 and approximately midway between the apertures 21 and the edge of lip 50. The ionizing ring 71 is insulated from adjacent elements and is physically supported by a plurality of insulators 72 which extend from baffle 59. The ionizing mechanism is similar to that provided in a Phillips or Penning ion gauge wherein gas atoms are ionized by accelerated electrons. The potential applied to the ionizing ring 71 is more positive than the potential of the high voltage power supply 27, thus the potential on the ionizing ring 71 is more positive than the potential of the baffles 58 and 59. The electric field between the baffles and the ionizing ring 71 will accelerate a free electron toward the ionizing ring 71 but owing to the axially directed magnetic field from the coils 22, 23 and 24, the electron follows the magnetic field lines and thus a majority of such electrons will not strike the ionizing ring 71. The electron passes the ring 71 and is then decelerated by the electric field. The electron eventually stops, and is accelerated back toward the ionizing ring 71 but again misses the ring and the foregoing process is repeated, the electron being alternately accelerated and decelerated back and forth. Since the effective path length of the electron has been greatly extended, the probability that gas atoms will be ionized by such electrons is greatly enhanced. Each time an atom is ionized, an additional electron is available for ionizing other atoms. The major portion of the gas is not ionized by the Penning gauge, the neutral particles sweeping the charged particles across the magnetic field lines without difficulty, distributing the charged particles through the gas where they aid creation of the initial breakdown across the gas within the external tank.

Other means for supplying free eletrons to the gas may be provided in the vave such as an arc or an electron emitting element. As previously mentioned, the ionizing process may not be necessary in every instance wherein the present invention is utilized, but depending upon the parameters, improved operation may be obtained by including the pre-ionization process.

Considering now the operation of the invention there is shown in FIGURE 3a a schematic outline of the tank 7 and other salient elements of the invention, detail having been omitted to show more clearly the gases, plasma bodies and fields present. In FIGURE 3a there is shown an annular gas body 81 just after it has been released by operation of the valve mechanism 17 as hereinbefore described and while the gas is diffusing outwardly from the aperture 19 toward the tank neck 8. The distance from the aperture 19 to the nearest point on the wall of the neck 8 is small when compared to the distance from the aperture 19 to the insulator 11, thus gas 81 will reach the neck 8 long before the gas contacts the insulator 11. A similar process is simultaneously occurring at the second valve mechanism 18 where gas 82 is released through the apertures 21 thereof.

Figure 3B:
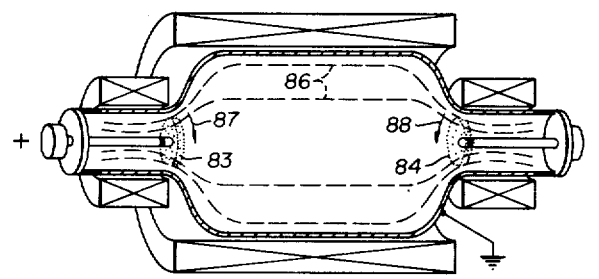

Referring now to FIGURE 3b, as soon as the gas contacts the wall of the neck 8, a current flows through the gas, rapidly ionizing and forming an annular plasma body 83 comprised of approximately equal numbers of electrons and ions. A similar plasma body 84 is formed in the opposite end around the second valve mechanism 18. The high electric field existing between the valve structure 17 and the neck 8 causes the various plasma particles to tend to be radially accelerated, the electrons toward the valve and the ions outwardly toward the neck 8. However, the plasma particles are constrained by the magnetic field lines 86 shown in FIGURE 3b and the individual particles obtain cycloidal paths around the valve structure 17. While the radial force on the electrons and ions is in opposite directions, the resultant annular motion of the two types of particles is in the same direction and the plasma body 83 rotates as a unit in the direction indicated by arrow 87. The potential applied to the second valve mechanism 18 is opposite in polarity as hereinbefore described and thus the second plasma body 84 rotates in opposite direction as indicated by arrow 88.

Figure 3C:
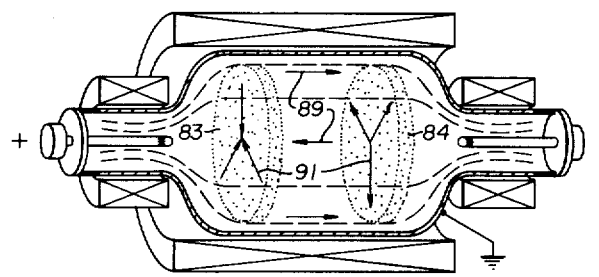

As shown in FIGURE 3c the centrifugal force experienced by the rotating plasma causes the plasma bodies 83 and 84 to move toward the center of the tank 7 along the diverging magnetic field lines 86 inasmuch as the field is a magnetic mirror. During the time the two plasma bodies are approaching, a heavy current starts to circulate between the centers of the bodies 83 and 84 and between the outer circumferential edges of the bodies. Since the internal electric field of each plasma body from the circumference to the center is in a direction opposite that of the other plasma body, there is a large potential difference of one polarity between the two outer edges of the plasma bodies and a potential difference of the opposite polarity between the centers of the two bodies. Electrons, being much more mobile along magnetic field lines than ions, readily move along the magnetic lines 86 from one plasma body to the other as indicated by the electron current arrows 89. Within each plasma body there is a concomitant radial flow of ions between the outer edge and the center. The ions, having a larger Larmor radius than the electrons, more readily move across the magnetic field line 86, the ions flowing as indicated by arrows 91, thus completing the circuit. The current flow raises the temperature of the plasma bodies.

Figure 3D:
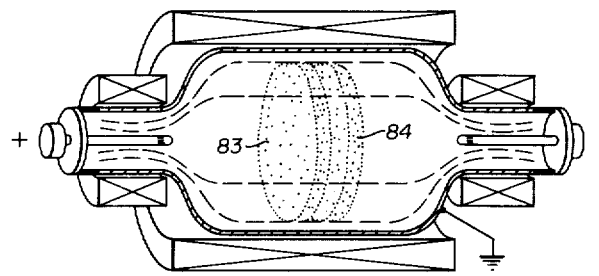

As shown in FIGURE 3d, the two plasma bodies 83 and 84 rapidly approach and merge. While the axial velocities of the two plasma bodies 83 and 84 is not of primary significance, the two bodies are rotating in opposite directions and the relative velocity between individual plasma particles in one body and the other body is quite high, the probability of a collision between individual ions being thereby greatly enhanced. The result of such a collision may be a fusion reaction in which a neutron or other particle is released, the sum of the energies of the particles after the fusion reaction being higher than that of the colliding particles. The heated plasma may be utilized as a source of ions or the emitted neutrons are available for heating purposes and for irradiations. Where a sufficient number of fusion reactions occur, the energy liberated is higher than the energy required to operate the device, thereby providing a source of power.

Typically, the magnetic field in the necks 8 and 9 may have an intensity of 30 kilogaus while the potential available at terminals 28 and 29 of the high voltage power supply 31 may be plus 150,000 volts and negative 150,000 volts respectively. The neck portions may have a diameter of approximately five inches and a length of two feet, half of which may be insulation. The larger portion of the tank may have a diameter of ten inches and a length of two to three feet, thus the overall length of the apparatus may be of the order of six to seven feet.

While the invention has been disclosed with respect to a single embodiment, it will be apparent to those skilled in the art that numerous variations and modifications may be made within the spirit and scope of the invention and thus it is not intended to limit the invention except as defined in the following claims.

What is claimed is:

1. In a plasma generating and containment device, the combination comprising a pair of spaced apart electrodes each having a passage therein for emitting gas, a gas supply coupled to said passages of said electrodes, valve means operable on each of said passages of said electrode, an annular conductive means encircling each of said electrodes in spaced relationship therefrom, means for applying a potential difference between a first of said pair of electrodes and said conductive means and for applying an opposite potential, difference between the second of said pair of electrodes and said conductive means, and means providing a magnetic field having a flux component perpendicular to said electric fields, said magnetic field being of greater intensity in the vicinity of said electrodes than in the region therebetween.

2. In a plasma generating and containment device, the combination comprising a vacuum enclosure, a pair of gas valves spaced apart within said enclosure, means producing a magnetic field within said vacuum enclosure which field is directed from the region of a first of said valves to the region of the second thereof, the intensity of said magnetic field being greater in the vicinity of said valves and of less intensity therebetween, means producing oppositely directed electric fields around each of said valves which electric fields are crossed with said magnetic field to provide for the producing of two oppositely rotating annular plasma bodies, and a gas supply coupled to each of said valves.

3. In a plasma device, the combination comprising a cylindrically shaped conductive element, a magnetic field producing means disposed adjacent said conductive element and providing a substantially axially directed magnetic field therethrough, said magnetic field being of decreased magnitude at an intermediate region of said conductive element, a pair of valves disposed within said conductive element one at each side of said intermediate region thereof, a high voltage power supply providing oppositely directed electric fields between each of said valves and said conductive element, and a gas supply connected to said valves.

4. In a plasma device as described in claim 3, the further combination of synchronized control means connected to each of said valves for simultaneously opening each thereof.

5. In a plasma generating and containment device, the combination comprising a long cylindrical conductive element having an enlarged mid-section, an annular field coil means disposed coaxially around said element and providing a longitudinal magnetic field therethrough of decreased intensity through said mid-section, a pair of rapidly opening valve mechanisms disposed along the axis of said element one at each side of said mid-section thereof, a high voltage power supply having a neutral terminal connected to said element and having a negative voltage terminal connected to a first of said valve mechanisms and a positive voltage terminal connected to the second of said valve mechanisms, a gas supply connected to each of said valve mechanisms, and control means connected to said valve mechanisms for providing synchronized opening thereof.

6. In a device for producing, containing and heating a plasma, the combination comprising a cylindrical conductive element having end sections of reduced diameter, a field coil assembly disposed coaxially around said element and providing a substantially longitudinally directed magnetic field therein and providing a magnetic mirror field at each of said end section thereof, a pair of spaced tubular electrodes disposed along the axis of said element one of said electrodes extending through each of said mirror field and each having a fast opening valve mechanism contained therein, a high voltage power supply applying opposite polarities to said pair of electrodes, a gas supply connected to said valve mechanisms, a valve control means operatively connected to said valves and providing for simultaneous opening thereof, and a magnetic power supply connected to said magnet coil assembly.

7. In a plasma generating and heating device, the combination comprising a cylindrical electrically conductive vacuum enclosure having a mid-section of relatively large diameter and opposite end sections of lesser diameter, a field coil assembly encircling said enclosure and providing a longitudinal magnetic field therein which field is of maximum intensity in said end sections thereof, a pair of insulators each closing one of said end sections of said enclosure, a first and a second tubular valve structure each being electrically isolated from said enclosure by a separate one of said insulators and being aligned along the axis of said enclosure, said valve structures each having gas release apertures situated near the wall of the associated enclosure end section and relatively far from the associated one of said insulators, a gas supply coupled to each of said valve structures, a valve opening control operatively coupled to each of said valve structures, and a high voltage power supply having a negative voltage terminal connected to said first valve structure and a positive voltage terminal connected to said second valve structure.

8. In a plasma generating apparatus, the combination comprising a cylindrical conductive element having a large central section and a pair of opposite end sections of lesser diameter, a first annular field coil disposed coaxially around said central section of said element, a pair of annular mirror field second coils each disposed coaxially around one of said end sections of said element, power supply means connected to said coils, a pair of annular insulators each being coaxially disposed at an opposite end section of said element, a pair of tubular apertured electrodes, each thereof extending coaxially through a separate one of said insulators and projecting into said cylindrical conductive element along the centerline thereof, a high voltage power supply having a positive voltage terminal connected to one of said electrodes and a negative voltage terminal connected to the other of said electrodes and a neutral terminal connected to said conductive element, means providing a vacuum within said conductive element, a gas source connected to each of said tubular electrodes, and a pair of valve means one operative on each of said electrodes to simultaneously release gas from each thereof.

9. A plasma device as described in claim 8 wherein each of said valve means comprises a rod having a first end extending longitudinally within said tubular electrode and having an opposite second end of enlarged diameter, said rod having a limited degree of freedom for axial movement, an element disposed within said electrode adjacent said first end of said rod and forming a small gas chamber in conjunction therewith, an annular third coil encircling said rod, a control switch, a power supply connectable to said coil through said switch, an annular field shaping member encircling at least the portion of said third coil closest to said enlarged end of said rod and having an end portion extending inwardly towards said rod between said enlarged end thereof and said third coil, said field shaping member being formed of non-magnetic electrically conductive material whereby the expanding field of said third coil is concentrated against said enlarged portion of said rod and reacts thereagainst to momentarily open said gas chamber.

10. In a plasma generating and containment device, the combination comprising a cylindrical conductive element having an enlarged central portion and end portions of lesser diameter, a magnetic field coil assembly disposed around said conductive element and forming an axially directed field therein which is of greatest intensity in said end portions, a pair of valves one being disposed in each of said end portions of said element and insulated therefrom, said valves each having gas egress apertures, a high voltage power supply connected to said valves and said conductive element and creating an electric field in one direction between a first of said valves and said element and creating an electric field in the opposite direction between the second of said valves and said element, a gas supply coupled to said valves, a power supply connected to said field coil assembly, and an electron emitting structure disposed within each of said valves near said gas egress apertures thereof, whereby free electrons are created in the gas emitted by said valves.

11. In a valve structure for a plasma generating device, the combination comprising a long housing having apertures therein, a rod having a first end extending within said housing to the region of said apertures and having an enlarged conductive head at the second end, a resilient member disposed within said housing against said first end of said rod and forming a small chamber in conjunction therewith, means introducing a gas into said chamber, an annular coil disposed coaxially around said rod, an annular field shaping member disposed coaxially around said rod adjacent said second end thereof and adjacent said coil, said member being made of a conductive material relatively impenetrable to expanding magnetic fields for concentrating flux from said coil against said enlarged second end of said rod and for causing a reaction thereagainst whereby said first end of said rod is momentarily removed from contact with said resilient member thereby opening said chamber and releasing the gas in said chamber through said housing apertures, a coil power supply, a switch for coupling said power supply to said coil, and an electron producing element disposed adjacent said chamber within said housing whereby gas emitted from said housing contains free electrons.

References Cited in the file of this patent

UNITED STATES PATENTS

| | | |
|---|---|---|
| 2,938,703 | Dietz | May 31, 1960 |
| 2,961,558 | Luce et al. | Nov. 22, 1960 |
| 3,005,767 | Boyer et al. | Oct. 24, 1961 |
| 3,013,768 | Mastra | Dec. 19, 1961 |
| 3,014,857 | Gow et al. | Dec. 26, 1961 |
| 3,021,272 | Baker et al. | Feb. 13, 1962 |
| 3,025,429 | Gow et al. | Mar. 13, 1962 |
| 3,031,398 | Tuck | Apr. 24, 1962 |